US008315795B2

(12) United States Patent
 Kikuchi

(10) Patent No.: US 8,315,795 B2
(45) Date of Patent: Nov. 20, 2012

(54) MAP DISPLAY SYSTEM, MAP DISPLAY, AND MAP DISPLAY METHOD

(75) Inventor: Shin Kikuchi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 548 days.

(21) Appl. No.: 12/601,656

(22) PCT Filed: May 30, 2007

(86) PCT No.: PCT/JP2007/061011
§ 371 (c)(1),
(2), (4) Date: Nov. 24, 2009

(87) PCT Pub. No.: WO2008/146374
PCT Pub. Date: Dec. 4, 2008

(65) Prior Publication Data
US 2010/0235085 A1  Sep. 16, 2010

(51) Int. Cl.
*G01C 21/00* (2006.01)
(52) U.S. Cl. ........ 701/428; 701/418; 701/432; 701/454; 701/457; 701/436
(58) Field of Classification Search .................. 701/400, 701/418, 422, 432, 454, 457, 433; 340/944, 340/988, 995.1, 995.11, 995.14, 995.15, 340/995.27
See application file for complete search history.

(56) References Cited

U.S. PATENT DOCUMENTS 6,006,161 A * 12/1999 Katou ........................... 701/410
6,067,502 A *  5/2000 Hayashida et al. ........... 701/428
6,202,026 B1 *  3/2001 Nimura et al. ................ 701/455
(Continued)

FOREIGN PATENT DOCUMENTS
JP        07-280577 A    10/1995
(Continued)

OTHER PUBLICATIONS
International Search Report of PCT/JP2007/061011, mailing date of Aug. 7, 2007.
(Continued)

*Primary Examiner* — Khoi Tran
*Assistant Examiner* — Nicholas Kiswanto
(74) *Attorney, Agent, or Firm* — Westerman, Hattori, Daniels & Adrian, LLP

(57) ABSTRACT

Even if a detailed map being displayed is continuously scrolled, the place of the detailed map being displayed is kept to a wide-area map. A map display system having a map display for displaying a plurality of maps and an information distribution server which is connected to the map display through a communication means and distributes map data to the map display comprises a display means for displaying a first map capable of being scrolled and a second map including the scope of the first map, a scroll control means for scrolling the first map, a condition judging means for judging whether or not to control the display form of the second map according to the result of the scroll of the first map by the scroll control means and a condition for controlling the display form of the second map set in advance, and a reduced scale control means for controlling the display form of the second map. The reduced scale control means controls the display form of the second map according to the result of the judgment of the condition judging means.

15 Claims, 9 Drawing Sheets

U.S. PATENT DOCUMENTS

| | | | |
|---|---|---|---|
| 6,898,523 B2 * | 5/2005 | Cochlovius et al. | 701/455 |
| 7,106,218 B2 * | 9/2006 | Kimura | 340/995.1 |
| 7,844,395 B2 * | 11/2010 | Aoyama | 701/432 |

FOREIGN PATENT DOCUMENTS

| | | |
|---|---|---|
| JP | 2003-186392 A | 7/2003 |
| JP | 2004-085330 A | 3/2004 |
| JP | 2005-062043 A | 3/2005 |
| JP | 2005-321575 A | 11/2005 |
| WO | 2005/109378 A1 | 11/2005 |

OTHER PUBLICATIONS

Notification of Transmittal of Translation of the International Preliminary Report on Patentability (Form PCT/IB/338) of International Application No. PCT/JP2007/061011 mailed Jan. 21, 2010 with Forms PCT/IB/373, PCT/ISA/237 and PCT/IB/326.

* cited by examiner

|  | SECOND MAP | | | | |
|---|---|---|---|---|---|
| LEVEL | MAP CLASSIFICATION | A | B | C | D |
| | | WIDE-AREA PICTURE 1 | MIDRANGE PICTURE 1 | DETAILED PICTURE 1 | CITY MAP 1 |
| A | WIDE-AREA PICTURE 1 | — | — | — | — |
| B | MIDRANGE PICTURE 1 | 6 TIMES | — | — | — |
| C | DETAILED PICTURE 1 | 12 TIMES | 6 TIMES | — | — |
| D | CITY MAP 1 | 21 TIMES | 15 TIMES | 9 TIMES | — |

(FIRST MAP on left axis)

(a)

|  | SECOND MAP | | | | |
|---|---|---|---|---|---|
| LEVEL | MAP CLASSIFICATION | A | B | C | D |
| | | WIDE-AREA PICTURE 1 | MIDRANGE PICTURE 1 | DETAILED PICTURE 1 | CITY MAP 1 |
| A | WIDE-AREA PICTURE 1 | — | — | — | — |
| B | MIDRANGE PICTURE 1 | 4 SECONDS | — | — | — |
| C | DETAILED PICTURE 1 | 8 SECONDS | 4 SECONDS | — | — |
| D | CITY MAP 1 | 14 SECONDS | 10 SECONDS | 6 SECONDS | — |

(FIRST MAP on left axis)

| | | SECOND MAP | | | | | | | | | |
|---|---|---|---|---|---|---|---|---|---|---|---|
| | LEVEL | A | | B | | C | | | D | | |
| | LEVEL / MAP CLASSIFICATION | WIDE-AREA PICTURE 1 | WIDE-AREA PICTURE 2 | MIDRANGE PICTURE 1 | MIDRANGE PICTURE 2 | DETAILED PICTURE 1 | DETAILED PICTURE 2 | DETAILED PICTURE 3 | CITY MAP 1 | CITY MAP 2 | CITY MAP 3 |
| FIRST MAP / A | WIDE-AREA PICTURE 1 | – | – | – | – | – | – | – | – | – | – |
| | WIDE-AREA PICTURE 2 | 3 TIMES | – | – | – | – | – | – | – | – | – |
| B | MIDRANGE PICTURE 1 | 6 TIMES | 3 TIMES | – | – | – | – | – | – | – | – |
| | MIDRANGE PICTURE 2 | 9 TIMES | 6 TIMES | 3 TIMES | – | – | – | – | – | – | – |
| C | DETAILED PICTURE 1 | 12 TIMES | 9 TIMES | 6 TIMES | 3 TIMES | – | – | – | – | – | – |
| | DETAILED PICTURE 2 | 15 TIMES | 12 TIMES | 9 TIMES | 6 TIMES | 3 TIMES | – | – | – | – | – |
| | DETAILED PICTURE 3 | 18 TIMES | 15 TIMES | 12 TIMES | 9 TIMES | 6 TIMES | 3 TIMES | – | – | – | – |
| D | CITY MAP 1 | 21 TIMES | 18 TIMES | 15 TIMES | 12 TIMES | 9 TIMES | 6 TIMES | 3 TIMES | – | – | – |
| | CITY MAP 2 | 24 TIMES | 21 TIMES | 18 TIMES | 15 TIMES | 12 TIMES | 9 TIMES | 6 TIMES | 3 TIMES | – | – |
| | CITY MAP 3 | 27 TIMES | 24 TIMES | 21 TIMES | 18 TIMES | 15 TIMES | 12 TIMES | 9 TIMES | 6 TIMES | 3 TIMES | – |

(b)

| | | SECOND MAP | | | | | | | | | |
|---|---|---|---|---|---|---|---|---|---|---|---|
| | LEVEL | A | | B | | C | | | D | | |
| | LEVEL / MAP CLASSIFICATION | WIDE-AREA PICTURE 1 | WIDE-AREA PICTURE 2 | MIDRANGE PICTURE 1 | MIDRANGE PICTURE 2 | DETAILED PICTURE 1 | DETAILED PICTURE 2 | DETAILED PICTURE 3 | CITY MAP 1 | CITY MAP 2 | CITY MAP 3 |
| FIRST MAP / A | WIDE-AREA PICTURE 1 | – | – | – | – | – | – | – | – | – | – |
| | WIDE-AREA PICTURE 2 | 2 SECONDS | – | – | – | – | – | – | – | – | – |
| B | MIDRANGE PICTURE 1 | 4 SECONDS | 2 SECONDS | – | – | – | – | – | – | – | – |
| | MIDRANGE PICTURE 2 | 6 SECONDS | 4 SECONDS | 2 SECONDS | – | – | – | – | – | – | – |
| C | DETAILED PICTURE 1 | 8 SECONDS | 6 SECONDS | 4 SECONDS | 2 SECONDS | – | – | – | – | – | – |
| | DETAILED PICTURE 2 | 10 SECONDS | 8 SECONDS | 6 SECONDS | 4 SECONDS | 2 SECONDS | – | – | – | – | – |
| | DETAILED PICTURE 3 | 12 SECONDS | 10 SECONDS | 8 SECONDS | 6 SECONDS | 4 SECONDS | 2 SECONDS | – | – | – | – |
| D | CITY MAP 1 | 14 SECONDS | 12 SECONDS | 10 SECONDS | 8 SECONDS | 6 SECONDS | 4 SECONDS | 2 SECONDS | – | – | – |
| | CITY MAP 2 | 16 SECONDS | 14 SECONDS | 12 SECONDS | 10 SECONDS | 8 SECONDS | 6 SECONDS | 4 SECONDS | 2 SECONDS | – | – |
| | CITY MAP 3 | 18 SECONDS | 16 SECONDS | 14 SECONDS | 12 SECONDS | 10 SECONDS | 8 SECONDS | 6 SECONDS | 4 SECONDS | 2 SECONDS | – |

Fig. 4

MAP DISPLAY SYSTEM, MAP DISPLAY, AND MAP DISPLAY METHOD

TECHNICAL FIELD

The present invention relates to a map display system, a map display, and a map display method used in a route search server or the like; and particularly relates to a map display system, a map display, and a map display method having functions for displaying a detailed map and also displaying a wide-area map containing the area of the detailed map so that the area of the detailed map in the display can be distinguished, wherein the reduced scale of the wide-area map is changed when predetermined conditions are satisfied, and the area of the scrolled detailed map is kept inside of the wide-area map even if the detailed map is continuously scrolled.

BACKGROUND ART

In the past there have been known navigation devices and navigation systems wherein a user is guided by using map data and road data to conduct a search for a route from a desired point of departure to a destination.

Examples of such navigation devices and navigation systems put into practice include automobile-mounted car navigation devices for guiding an operator along a route.

The aforementioned car navigation systems use a GPS (global positioning system), wherein GPS signals sent from a plurality of GPS satellites orbiting the globe are received by a GPS antenna; the satellite positions, time information, and the like included in the GPS signals are analyzed; and the position is specified. The number of the GPS satellites must be at least four. The independent positioning accuracy of a GPS is generally within 10 m, but this can be improved to 5 m or less by using a DIPS (differential GPS).

Recently, the performance of portable phones, PHs, and other portable communication terminal devices has been dramatically improving, and these devices have become more multifunctional. Data communication functions in particular have been strengthened in addition to voice communication functions, and users are provided with various data communication services via the Internet. There has particularly been a trend according to which positioning units that have until now been installed only in some portable phones, e.g., GPS receivers and other devices which determine position by receiving signals from GPS satellites, are currently being installed in all models of portable phones known as third-generation phones.

Navigation systems for automobiles (car navigation systems) are being developed as an applied technology, and also being put into practice are communicable navigation systems for pedestrians, wherein a route search request is sent to a route search server by using a portable phone as a navigation terminal, and map/route guidance distributed from the route search server is received as a result.

Furthermore, a pedestrian navigation system is a system in which not only portable phones, but also headphone stereos and other music players, portable compact game devices, PDAs, and other portably terminals can be used as navigation terminals. A route guidance function including public transportation is preferably added, and the route search server stores public transportation routes and service schedule data as traffic network data in addition to road network data for pedestrian route searches.

This type of pedestrian navigation system generally provides guidance by searching for a route from the point of departure to the destination using airplane, train, electric train, bus, or other transportation means on the basis of the departure time, the point of departure, the destination, the arrival time, and other route search conditions.

Specifically, a pedestrian navigation system refers to traffic network data, which is a database of public transportation route data and service schedule data, and suggests one or more candidates for guidance routes (trains and other transportation means) which join the point of departure with the destination, including connections, and for which usable transportation means are reached sequentially as part of the route to satisfy the route search conditions. It is common to enable the time required, the number of connections, the fares, and other conditions to also be specified as route search conditions.

From this manner of background art, Patent Document 1 (Japanese Laid-open Patent Application No. 2003-186392) given below, for example, discloses as a "map display" a technique whereby the display screen is split in the map display of the navigation system, and a detailed map and its display scope are displayed in a frame or the like in a wide-area map by a method for superposing a wide-area map over another map.

The aforementioned Patent Document 1 discloses a technique whereby the display screen is split when the scrolling operation is performed, the map being scrolled is displayed on one of the split screens, the wide-area map is displayed on the other split screen, and the area being scrolled is displayed in the wide-area map. This makes it possible to easily understand what area is being represented by the map displayed on the display screen when the map is scrolled.

Patent Document 1

Japanese Laid-open Patent Application No. 2003-186392 (paragraph [0021], FIG. 1)

DISCLOSURE OF THE INVENTION

Problems the Invention is Intended to Solve

In the prior art disclosed in the aforementioned Patent Document 1, the reduced scale of the wide-area map is determined by a ratio to the reduced scale of the map being scrolled (Patent Document 1, paragraph [0021]). Therefore, a problem has been caused in that when the scrolling process is continued for the detailed map being scrolled, sometimes the location of the currently displayed detailed map being scrolled moves outside of the wide-area map, and it becomes impossible to tell the location of the currently displayed detailed map being scrolled even while looking at the wide-area map.

As a result of various research intended to solve the problems described above, the inventors of the present invention have devised a way to solve the problems described above and have completed the present invention by providing a link to the scrolling process (for example, scrolling amount or the like) of one of the maps being scrolled and controlling the display form (for example, the change in reduced scale) of the other map when the scrolling operation has satisfied a predetermined condition.

Specifically, the present invention is intended to solve the problems described above, and an object thereof is to provide a map display system, a map display, and a map display method having functions for displaying a detailed map and displaying a wide-area map containing the area of the detailed map so that the area of the detailed map in the display can be distinguished, wherein the reduced scale of the wide-area map is changed when predetermined conditions are satisfied, and the area of the scrolled detailed map is kept inside of the wide-area map even if the detailed map is continuously scrolled.

Means for Solving the Abovementioned Problems

In order to solve these problems, the invention according to a first aspect is:

a map display system comprising a map display for displaying a plurality of maps, and an information distribution server for distributing map data to the map display, the information distribution server being connected to the map display via communication means, the map display system characterized in comprising:

display means for displaying a scrollable first map and a second map containing the scope of the first map;

scroll control means for scrolling the first map;

condition judging means for judging whether or not a result obtained by scrolling the first map by the scroll control means has satisfied a preset condition; and display control means for controlling the display form of the second map; wherein the display control means is configured so as to control the display form of the second map on the basis of the judgment result of the condition judging means.

The invention according to a second aspect is the map display system according to the first aspect, characterized in that the condition judging means judges whether or not the distance over which the first map is scrolled by the scroll control means has reached a predetermined distance; and the display control means is configured so as to control the reduced scale of the second map on the basis of the judgment result of the condition judging means.

The invention according to a third aspect is the map display system according to the first aspect, characterized in that the condition judging means judges whether or not the time during which the first map is scrolled by the scroll control means has exceeded a predetermined time; and the display control means is configured so as to control the reduced scale of the second map on the basis of the judgment result of the condition judging means.

The invention according to a fourth aspect is the map display system according to the first aspect, characterized in that the condition judging means judges whether or not the administered section has been changed by the scrolling of the first map via the scroll control means; and the display control means is configured so as to control the reduced scale of the second map on the basis of the judgment result of the condition judging means.

The invention according to a fifth aspect is the map display system according to any of the first through fourth aspects, characterized in that the map display system further comprises positioning means for measuring the current position of the map display, and route search means for searching for a route from a point of departure to a destination on the basis of route search conditions; and the display means is configured so as to display a map using map data of the guidance route searched by the route search means and to display on the map a current position mark indicating the current position measured by the positioning means.

The invention according to a sixth aspect is a map display for displaying a plurality of maps, the map display characterized in comprising:

display means for displaying a scrollable first map and a second map containing the scope of the first map;

scroll control means for scrolling the first map;

condition judging means for judging whether or not a result obtained by scrolling the first map by the scroll control means has satisfied a preset condition; and display control means for controlling the display form of the second map; wherein the display control means is configured so as to control the display form of the second map on the basis of the judgment result of the condition judging means.

The invention according to a seventh aspect is the map display according to the sixth aspect, characterized in that the condition judging means judges whether or not the distance over which the first map is scrolled by the scroll control means has reached a predetermined distance; and the display control means is configured so as to control the reduced scale of the second map on the basis of the judgment result of the condition judging means.

The invention according to an eighth aspect is the map display according to the sixth aspect, characterized in that the condition judging means judges whether or not the time during which the first map is scrolled by the scroll control means has exceeded a predetermined time; and the display control means is configured so as to control the reduced scale of the second map on the basis of the judgment result of the condition judging means.

The invention according to a ninth aspect is the map display according to the sixth aspect, characterized in that the condition judging means judges whether or not the administered section has been changed by the scrolling of the first map via the scroll control means; and the display control means is configured so as to control the reduced scale of the second map on the basis of the judgment result of the condition judging means.

The invention according to a tenth aspect is the map display according to any of the sixth through ninth aspects, characterized in that the map display further comprises positioning means for measuring the current position of the map display; and the display means displays a map using map data of a guidance route searched based on route search conditions, and displays on the map a current position mark indicating the current position measured by the positioning means.

The invention according to an eleventh aspect is a map display method in a map display comprising display means for displaying a plurality of maps, the map display method characterized in having:

a first step for displaying a scrollable first map on the display means;

a second step for displaying a second map containing the scope of the first map on the display means;

a third step for scrolling the first map;

a fourth step for judging whether or not a result obtained by scrolling the first map in accordance with the third step has satisfied a preset condition; and a fifth step for controlling the display form of the second map on the basis of the judgment result via the fourth step.

The invention according to a twelfth aspect is the map display method according to the eleventh aspect, characterized in that the fourth step judges whether or not the distance over which the first map is scrolled in accordance with the third step has reached a predetermined distance; and the fifth step is configured so as to control the reduced scale of the second map on the basis of the judgment result via the fourth step.

The invention according to a thirteenth aspect is the map display method according to the eleventh aspect, characterized in that the fourth step judges whether or not the time during which the first map is scrolled in accordance with the third step has exceeded a predetermined time; and the fifth step is configured so as to control the reduced scale of the second map on the basis of the judgment result via the fourth step.

The invention according to a fourteenth aspect is the map display method according to the eleventh aspect, characterized in that the fourth step judges whether or not the administered section has been changed by the scrolling of the first map in accordance with the third step; and the fifth step is configured so as to control the reduced scale of the second map on the basis of the judgment result via the fourth step.

The invention according to a fifteenth aspect is the map display method according to any of the eleventh through fourteenth aspects, characterized in that the map display method further has a step for displaying a map using map data of a guidance route searched based on route search conditions, and displaying on the map a current position mark indicating the current position measured by positioning means.

Effect of the Invention

The invention according to the first aspect provides a map display system comprising a map display for displaying a plurality of maps, and an information distribution server for distributing map data to the map display, the information distribution server being connected to the map display via communication means; the map display system further comprising display means for displaying a scrollable first map and a second map containing the scope of the first map, scroll control means for scrolling the first map, condition judging means for judging whether or not a result obtained by scrolling the first map by the scroll control means has satisfied a preset condition, and display control means for controlling the display form of the second map, wherein the display control means is configured so as to control the display form of the second map on the basis of the judgment result of the condition judging means.

Therefore, in a map display system comprising display means for displaying a scrollable first map and a second map containing the scope of the first map, a judgment is made as to whether the display form of the second map needs to be optimally changed in conjunction with the scrolling process of the first map, and the display form is changed as necessary based on the judgment result. Therefore, even if the scope of the first map continues to be moved by scrolling, a more optimally changed second map is displayed by controlling the display form of the second map in accordance with the scrolling process, and it is therefore possible to easily perceive the position and scope of the scrolled first map in the second map changed to a more optimal display form.

The invention according to the second aspect provides the map display system according to the first aspect, wherein the condition judging means judges whether or not the distance over which the first map is scrolled by the scroll control means had reached a predetermined distance, and the display control means is configured so as to control the reduced scale of the second map on the basis of the judgment result of the condition judging means.

Therefore, in a map display system comprising display means for displaying a scrollable first map and a second map containing the scope of the first map, a judgment is made as to whether the reduced scale of the second map needs to be optimally changed in conjunction with the scrolling process of the first map, and the reduced scale is changed as necessary based on the judgment result. Therefore, even if the scope of the first map continues to be moved by scrolling, a wider-range second map is displayed by increasing the reduced scale along with the increase in scrolling distance, and it is therefore possible to easily perceive the position and scope of the scrolled first map.

The invention according to the third aspect provides a map display system according to the first aspect, wherein the condition judging means judges whether or not the time during which the first map is scrolled by the scroll control means had exceeded a predetermined time, and the display control means is configured so as to control the reduced scale of the second map on the basis of the judgment result of the condition judging means.

Therefore, in a map display system comprising display means for displaying a scrollable first map and a second map containing the scope of the first map, a judgment is made as to whether the reduced scale of the second map needs to be optimally changed in conjunction with the scrolling process of the first map, and the reduced scale is changed as necessary based on the judgment result. Therefore, even if the scope of the first map continues to be moved by scrolling, a wider-range second map is displayed by increasing the reduced scale along with the increase in scrolling time, and it is therefore possible to easily perceive the position and scope of the scrolled first map.

The invention according to the fourth aspect provides the map display system according to the first aspect, wherein the condition judging means judges whether or not the administered section had been changed by the scrolling of the first map in accordance with the scroll control means, and the display control means is configured so as to control the reduced scale of the second map on the basis of the judgment result of the condition judging means.

Therefore, in a map display system comprising display means for displaying a scrollable first map and a second map containing the scope of the first map, a judgment is made as to whether the reduced scale of the second map needs to be optimally changed in conjunction with the scrolling process of the first map, and the reduced scale is changed as necessary based on the judgment result. Therefore, even if the scope of the first map continues to be moved by scrolling, a wider-range second map is displayed by increasing the reduced scale in accordance with the change in the administered section of the first map due to scrolling, and it is therefore possible to easily perceive the position and scope of the scrolled first map.

In the invention according to the fifth aspect, the map display system according to any of the first through fourth aspects further comprises positioning means for measuring the current position of the map display, and route search means for searching for a route from a point of departure to a destination on the basis of route search conditions, and the display means is configured so as to display a map using map data of the guidance route searched by the route search means and to display on the map a current position mark indicating the current position measured by the positioning means.

Therefore, in a map display system comprising display means for displaying a scrollable first map and a second map containing the scope of the first map, a judgment is made as to whether the reduced scale of the second map needs to be optimally changed in conjunction with the scrolling process of the first map, and the reduced scale is changed as necessary based on the judgment result. Therefore, even if the scope of the first map continues to be moved by scrolling, a second map is displayed whose reduced scale has been changed according to the scrolling process, and it is therefore possible to easily perceive the position and scope of the scrolled first map.

In the invention according to any of the sixth through tenth aspects, it is possible to provide a map display constituting the map display system of the invention according to any of the first through fifth aspects.

Furthermore, in the invention according to any of the eleventh through fifteenth aspects, it is possible to provide a map display method in the map display of the invention according to any of the sixth through tenth aspects.

BRIEF DESCRIPTION OF THE DRAWINGS

FIG. 3 is a view showing the configuration of a map data management table storing the correlation between the map classification and the scrolling process specifics;

FIG. 4 is a diagram of another configuration of a map data management table storing the correlation between the map classification and the scrolling process specifics;

KEY TO SYMBOLS

Figure 1:
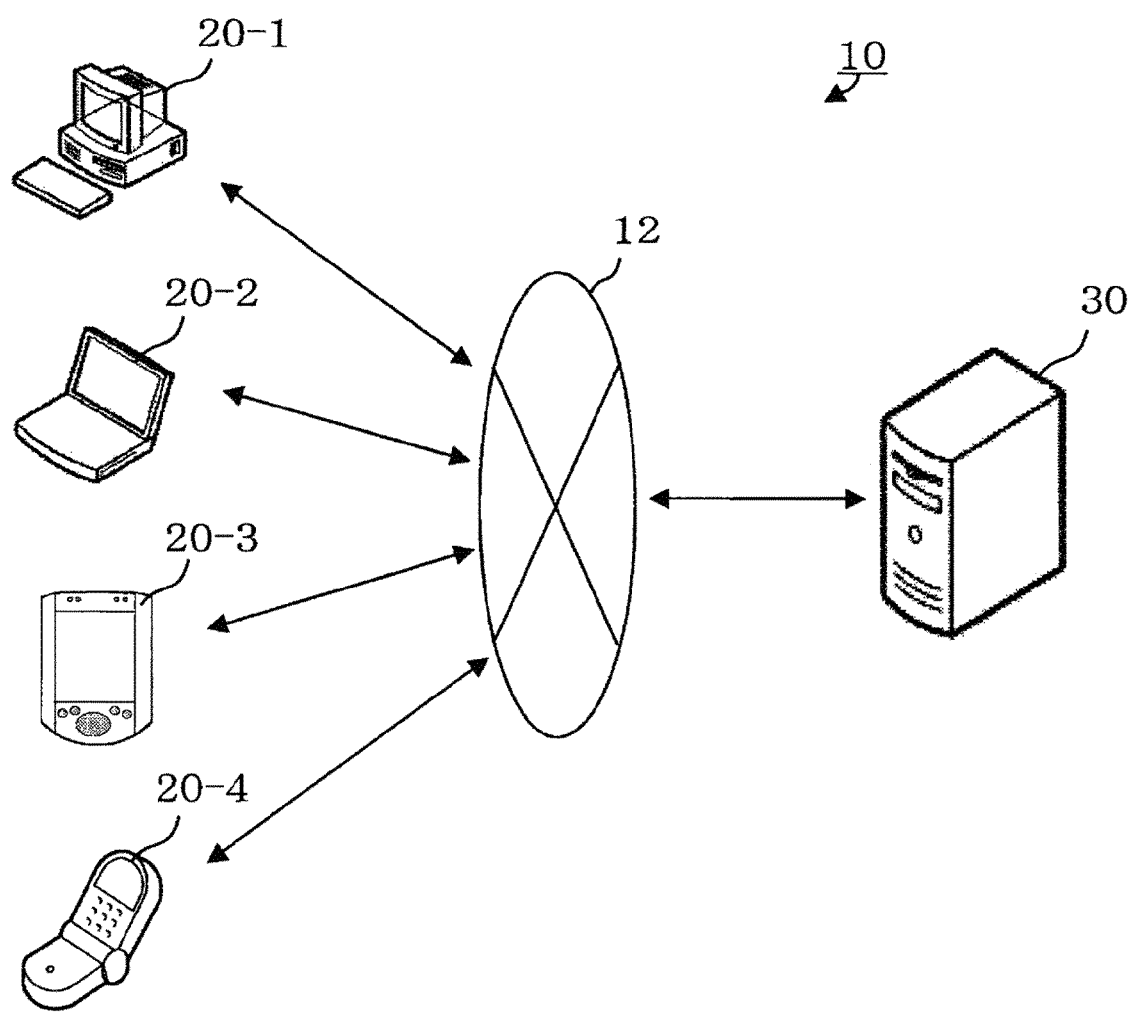
FIG. 1 is a system configuration view showing the configuration of a navigation system according to an example of the present invention.

10 Navigation system
12 Network
20 Map display
201 Control means
202 Communication means
203 Positioning means
204 Input means
205 Display means
206 Data request means
207 Data storage means
208 Scroll control means
209 Condition judging means
210 Reduced scale control means
30 Route search server
31 Control means
32 Route search means
33 Search network data DB
34 Route guidance means
35 Communication means
36 Map data DB

BEST MODE FOR CARRYING OUT THE INVENTION

Specific examples of the present invention are described in detail hereinbelow using examples and the drawings. The examples shown hereinbelow are intended to illustrate a navigation system for specifying the technological ideas of the present invention. The present invention is not intended to be limited to a navigation system and can be similarly applied to the other embodiments of map display systems included in the claims.

FIG. 1 is a system configuration view showing the configuration of a navigation system according to an example of the present invention. The navigation system 10 according to this example of the present invention is configured from a map display 20 connected via the Internet or another network 12, and a route search server 30 for providing various information.

A portable game terminal, portable music terminal, or other mobile terminals can be used in addition to, e.g., a personal computer (PC) 20-1, a notebook PC 20-2, a PDA (Personal Digital Assistant) terminal 20-3, or a portable phone 20-4 for the map display 20. In the navigation system 10, the map display 20 and the route search server 30 are connected via the network 12 as shown in FIG. 1, constituting a communicable navigation system.

Figure 2:
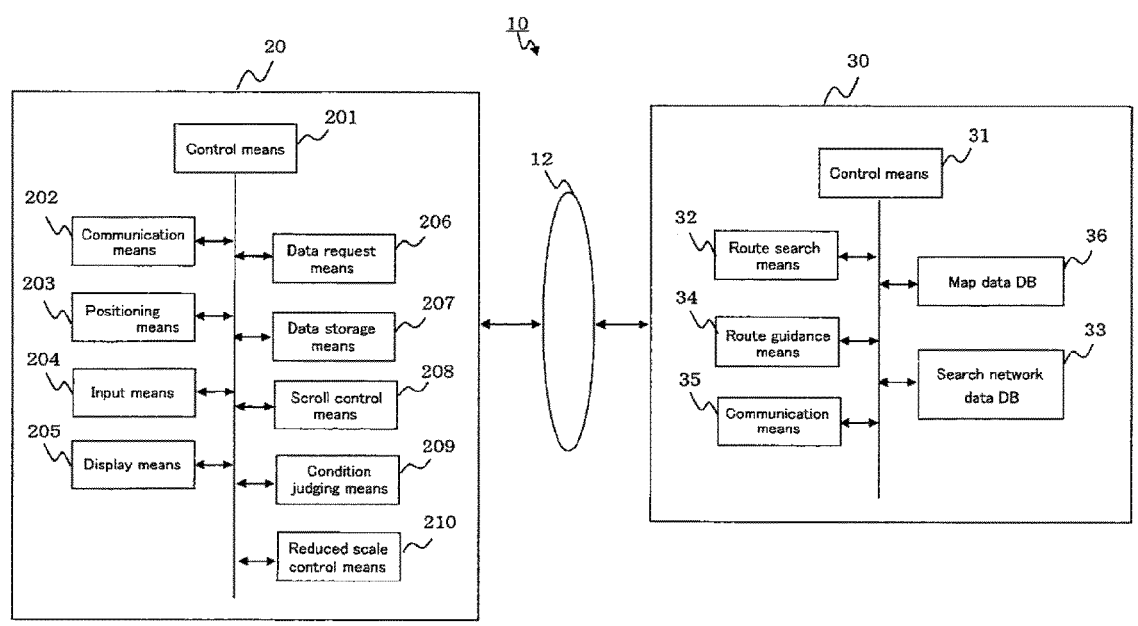
FIG. 2 is a block view showing the configuration of a map display and a route search server in an example of the present invention.

FIG. 2 is a block view showing the configuration of the map display 20 and the route search server 30 in the present example. FIG. 2 shows an example in which a portable phone is used as the map display 20.

The map display 20 has a function as a navigation terminal device. A pedestrian carries the device, and the device communicates wirelessly with a base station to establish a connection with the route search server 30 through the network 12 via the base station. The travel means (walking, automobile, or the like) and the current position or the desired point of departure and destination are set as route search conditions, and a route search request is transmitted to the route search server 30.

The route search server 30 refers to the road network data and searches for an optimal route according to the route search conditions, then compiles the optimal route into guidance route data, which is distributed together with map data to the map display 20. The route search server 30 also distributes to the map display 20 the map data requested according to a request from the map display 20.

The map display 20 is configured from control means 201, communication means 202, positioning means 203, input means 204, display means 205, data request means 206, data storage means 207, scroll control means 208, condition judging means 209, and reduced scale control means 210.

The control means 201 is configured based on a microprocessor, and is provided with RAM, ROM, and other storage means, similar to a common computer device. The control means controls the actions of the components through a control program stored in the storage means.

The communication means 202 is connected to the Internet via the network 12, and is an interface for communicating with the route search server 30. The communication means 202 includes a wireless communication unit and is configured so as to be in wireless communication with a portable phone base station in addition to exchanging packets of information via an Internet network.

The positioning means 203 comprises a GPS receiver, receives and processes a GPS satellite signal, and determines the current position (latitude and longitude) of the map display 20. The current positional information of the map display, as determined by the positioning means 203, is sent to the route search server 30 via the communication means 202.

The GPS receiver constituting the positioning means 203 may use an autonomous, MS-based, or A-GPS system. In the case of A-GPS, the device also has the effect of reducing the communication traffic with the route search server 30, because positioning can be stopped when the device comes to a standstill.

The input means 204 is composed of numeral keys, alphabet keys, and other functional keys, as well as selection keys, scroll keys (up, down, left, and right arrow keys), and the like. The input means is used to enter information about the point of departure and the destination, as well as various other route search conditions by operating the numeral and alphabet keys or selecting a desired menu from a menu screen displayed on the display means 205.

The display means 205 is configured from a display, a liquid crystal display unit, or the like, and is capable of displaying two or more screens. Image data of map data developed in VRAM or other image memory is displayed according to the guidance route data distributed in the route search server 30, and guidance (a guide) that is set by the guidance route data is presented as an audio guide. The display means 205 also has a function as operation means for selecting the desired menu from the menu screen, or operating the displayed and selected buttons or the like and performing the desired operation commands.

The point of departure, the destination, the departure time, the arrival time, and other route search conditions are set through the input means 204 or the display means 205, and mesh data (a unit map) is also designated through the input means 204 or the display means 205 in the case that map data is requested from the route search server 30.

It is common for the point of departure and destination settings to be indicated by latitude and longitude, but other possible options include a method for entering an address or phone number and converting it to latitude and longitude information through the database of the route search server 30, and a method for designating a point on the map displayed on the map display 20 and converting the point to latitude and longitude information. For the point of departure information, the current position of the map display 20 as determined by the positioning means 203 can be used as the point of departure, and the latitude and longitude information of the determined position point can be used.

The data request means 206 creates a route search request on the basis of the point of departure, the destination, the departure time, the arrival time, and other route search conditions set by the input means 204 or display means 205; and transmits the route search request to the route search server 30. The data request means 206 also creates a map data request on the basis of current positional information determined by the positioning means 203 or map reduced scale information detected by the reduced scale control means 210, and transmits the map data request to the route search server 30. The reduced scale control means 210 functions as display control means for controlling the display of the map.

The data storage means 207 temporarily stores the guidance route data, the map data, the guidance data, and other distributed data that is the route search result distributed from the route search server 30. This data is read from the data storage means 207, developed into bitmap form in the VRAM, and displayed on the display means 205 as necessary. In cases in which a map is displayed on the display means 205, a guidance route and a mark indicating the current position of the map display 20 are combined, and the current position mark is displayed so as to be the center of the display screen on a map of a specified reduced scale and a specified scope that include the current position of the map display 20 as determined by the positioning means 203.

Since errors are included in the determined positional information, a route matching process for correcting the current position to the guidance route is performed in cases in which the current position deviates from the guidance route. In cases in which audio guide data is added to the guidance route data distributed from the route search server 30, an audio message saying "Intersection 300 meters ahead, turn left" or the like is played through a speaker to guide the user when the map display 20 approaches an intersection point or a divergence point (guidance point), for example.

In cases in which the user requests a route search from the route search server 30 in the map display 20, the user operates the input means 204 and displays a service menu or a predetermined input screen on the display means 205; and the point of departure, the destination, the travel means (walking, a combination of walking and public transportation, automobile, or the like), the planned departure time, the desired arrival time, and other route search conditions are entered.

Upon receiving guidance route data and map data from the route search server 30, the map display 20 temporarily stores the data in storage means; and a current position mark showing the current position of the map display 20, a map of a predetermined scope including the current position, and a guidance route are developed in the VRAM and displayed on the display means 205. In cases in which the current position has changed and the map data is insufficient, the map display 20 requests map data from the route search server 30 to receive the lacking map data.

The scroll control means 208 performs a scroll process for moving the map displayed on the display means 205 in a direction corresponding to the operated key when the scroll key SK of the input means 204 is operated. For example, when the mark of a cursor C displayed on the display means 205 is displayed in the center of the usual image and the left directional key of the scroll key SK is pressed so as to move the cursor C to the left, the entire display screen scrolls to the right so that the position of the cursor C remains in the center. When the up directional key of the scroll key SK is pressed so as to move the cursor C upward, the entire display screen scrolls downward so that the cursor C remains positioned in the center.

The condition judging means 209 is intended to judge whether or not the conditions have been satisfied for changing the reduced scale of the second map through the scrolling operation of the first map. Any of the following three conditions are used as the effective conditions for changing the reduced scale of the map.

First, the first effective condition is whether or not the map scrolling distance has reached (exceeded) a predetermined value set in advance. Specifically, the condition judging means 209 calculates the first map scrolling distance by detecting a control signal outputted according to the scroll process performed by the scroll control means 208. A judgment is made as to whether or not the calculated scrolling distance has exceeded the predetermined value set in advance, e.g., triple a distance equivalent to the diagonal of the first map display screen. The predetermined value used in order to judge whether or not the condition has been satisfied is managed by a map data management table shown in FIG. 3(*a*) or 4(*a*) and described hereinafter, and the value is set in advance according to the types (hierarchies) of the first map and second map.

The second effective condition is whether or not the map scrolling time has exceeded a predetermined value set in advance. Specifically, the condition judging means 209 calculates the first map scrolling time by detecting a control signal outputted according to the scroll process performed by the scroll control means 208. A judgment is made as to whether or not the calculated scrolling time has exceeded the predetermined value set in advance, e.g., two seconds. The predetermined value used in order to judge whether the condition has been satisfied is managed by a map data management table shown in FIG. 3(b) or 4(b) and described hereinafter, and the value is set in advance according to the types (hierarchies) of the first map and second map.

The third effective condition is whether or not the administered section of the first map has been changed by the scrolling of the map. Specifically, the scroll process is performed by the scroll control means 208, whereby the condition judging means 209 judges whether or not there has been a change to the map administered section in a predetermined point within the first map display scope; e.g., in the center (cursor C position) of the display screen, the origin of the display coordinates, or another position. Information about the map administered section of the map used in order to judge whether this condition has been satisfied is set in advance as additional data of the map data distributed from the route search server 30.

In cases in which the condition judging means 209 has judged that any of the first through third conditions have been fulfilled, the reduced scale control means 210 either reads from the data storage means 207 the map data of the second map corresponding to the scrolling distance or scrolling time, or the map data of the second map corresponding to the changed administered section, or requests the route search server 30 to acquire the corresponding map data as necessary.

The map data of the second map that is read from the data storage means 207 by the reduced scale control means 210 is displayed together with a frame showing the display scope of the first map scrolled on the second display screen, the second display screen being provided so as to be superposed over the first display screen in which the first map of the display means 205 is displayed.

Coordinating the scrolling distance and scrolling time of the first map with the corresponding second map is easily accomplished through, e.g., the map data management table shown in FIG. 3, wherein the scrolling process specifics and the map data classification (wide area map to city map) are shown in table format. This map management table is distributed from the route search server 30 in advance and is kept in the reduced scale control means 210.

FIG. 3 is a view showing the configuration of a map data management table storing the correlation between the map classification and the scrolling process specifics. The map data management table in FIG. 3(a) stores second map data as map data of the corresponding classification when the first map scrolling distance falls into a particular scope for the four levels of map data displayed as the first map, the levels being a wide-area picture 1, which is a map of low density, up to a city map 1, which is a map of high density.

The map data management table in FIG. 3(b) stores second map data as map data of the corresponding classification when the first map scrolling time falls into a particular scope for the four levels of map data displayed as the first map, the levels being a wide-area picture 1, which is a map of low density, up to a city map 1, which is a map of high density.

In the map data management table shown in FIG. 3(a), the coordination is set up so that when, for example, the city map 1 is selected as the first map displayed by the map display 20, the displayed city map 1 is scrolled, and a detailed picture 1 is selected as the second map in cases in which the scrolling distance is three times a predetermined value of a distance equivalent to the diagonal of the first map display screen. The coordination is also set up so that the midrange picture 1 is selected in cases in which the scrolling distance is fifteen times the predetermined value of a distance equivalent to the screen diagonal, and the wide-area picture 1 is selected in cases in which the scrolling distance is twenty-one times the predetermined value of a distance equivalent to the screen diagonal.

The coordination is also set up so that when the detailed picture 1 is selected as the first map displayed by the map display 20, the displayed detailed picture 1 is scrolled, and the midrange picture 1 is selected as the second map in cases in which the scrolling distance is six times the predetermined value of a distance equivalent to the screen diagonal. The coordination is also set up so that the wide-area picture 1 is selected in cases in which the scrolling distance is twelve times the predetermined value of a distance equivalent to the screen diagonal.

The coordination is set up so that when the midrange picture 1 is selected as the first map displayed by the map display 20, the displayed midrange picture 1 is scrolled, and the wide-area picture 1 is selected as the second map in cases in which the scrolling distance is a predetermined value of six times the distance equivalent to the screen diagonal. When the wide-area picture 1 is selected as the first map displayed by the map display 20, the second map is not displayed even if the displayed wide-area picture 1 is scrolled.

With the map data management table shown in FIG. 3(b), the coordination is set up so that when, e.g., the city map 1 is selected as the first map displayed by the map display 20, the displayed city map 1 is scrolled, the detailed picture 1 is selected as the second map in cases in which the scrolling time continues for a predetermined value of six seconds, and the midrange picture 1 is selected in cases in which the scrolling time continues for a predetermined value of ten seconds. The coordination is also set up so that the wide-area picture 1 is selected in cases in which the scrolling time continues for a predetermined value of fourteen seconds.

The coordination is set up so that when the detailed picture 1 is selected as the first map displayed by the map display 20, the displayed detailed picture 1 is scrolled, and the midrange picture 1 is selected as the second map in cases in which the scrolling time continues for a predetermined value of four seconds. The coordination is also set up so that the wide-area picture 1 is selected in cases in which the scrolling time continues for a predetermined value of eight seconds.

The coordination is set up so that when the midrange picture 1 is selected as the first map displayed by the map display 20, the displayed midrange picture 1 is scrolled, and the wide-area picture 1 is selected as the second map in cases in which the scrolling time continues for a predetermined value of four seconds. When the wide-area picture 1 is selected as the first map displayed by the map display 20, the second map is not displayed even if the displayed wide-area picture 1 is scrolled.

Therefore, the reduced scale control means 210 refers to the map data management table and determines the corresponding map data classification on the basis of the scroll process, and may either read the corresponding map data from the data storage means 207 or transmit the map data classification to the route search server as necessary.

The reduced scale control means 210 comprises a map data enlargement function and can create enlarged or reduced map data by performing reduction or enlargement calculations at a predetermined ratio in cases in which the map data distributed from the route search server 30 is map data created in vector format. In other words, enlarged or reduced map data can be easily created in a predetermined ratio from the map data of a certain level. For example, the map data referred to as the wide-area picture 2 or the wide-area picture 3, which is enlarged at a predetermined ratio, can be created from the map data of the wide-area picture 1 of level A. The same applies to the map data of the other levels.

Therefore, the reduced scale control means 210 conducts an enlargement/reduction process in the range from the wide-area picture 1 to the city map 1 for each of the levels A through D shown in the map management table of FIG. 3, further increases the size of the maps as shown in the map data management table of FIG. 4, sets the scrolling process conditions for each of the map displays, and changes the classification of the map to be displayed.

In other words, FIG. 4 is a view showing another configuration of a map data management table that stores the correlation between the map classification and the scrolling process specifics, and FIG. 4 shows a configuration of the same map data management table as FIG. 3. This map management table is distributed from the route server 30 in advance and is kept in the reduced scale control means 210.

The map data distributed from the route search server 30 and stored in the data storage means 207 is in vector format and is configured from the respective differing amounts of information at the four levels A, B, D, and D (layers); i.e., from the wide-area map, which is a map of low density, up to the city map, which is a map of high density.

For example, the data storage means 207 stores only the four types of map data, which are the wide-area picture 1, the midrange picture 1, the detailed picture 1, and the city map 1. Map data in the range from other wide-area picture 2 to the city map 2, as well as in the detailed picture 3 and the city map 3, is created from the map data (vector data) in the range from the wide-area picture 1 to the city map 1 by the reduced scale control means 210, which conducts an enlargement/reduction process at predetermined enlargement/reduction ratio. Therefore, the map data correspondence between the route search server 30 and the map display 20 is preferably conducted only when maps of different levels are needed, and the communication load can be reduced.

The map data management table of FIG. 4(*a*) stores second map data of the corresponding classification when the first map scrolling distance falls into a particular scope for the map data of each of the map classifications within the range from the wide-area picture 1 to the city map 3 displayed as the first map. The map data management table of FIG. 4(*b*) stores second map data of the corresponding classification when the first map scrolling time falls in a particular scope for the map data of each of the map classifications within the range from the wide-area picture 1 to the city map 3 displayed as the first map.

With the map data management table shown in FIG. 4(*a*), when, for example, the city map 2 is selected as the first map displayed by the map display 20, the displayed city map 2 is scrolled, and the city map 1 is selected and displayed as the second map in cases in which the scrolling distance is a predetermined value of three times the distance equivalent to the diagonal of the first map display screen, but the second map is switched to the detailed picture 3 in cases in which the scrolling distance is a predetermined value of six times the distance equivalent to the diagonal of the screen.

At this time, the reduced scale control means 210 reads the map data of the detailed picture 1 from the data storage means 207. Otherwise, map data of the detailed picture 1 is distributed from the route search server 30 by transmission of the map data classification of the detailed picture 1 to the route search server 30 as necessary, and map data of the detailed picture 3 is created from this map data. The map is switched to the detailed picture 2 in cases in which the scrolling distance is a predetermined value of nine times the distance equivalent to the diagonal of the screen. At this time, however, map data of the detailed picture 1 is read from the data storage means 207, and map data of the detailed picture 2 is created.

With the map data management table shown in FIG. 4(*b*), when, for example, the detailed picture 2 is selected as the first map displayed by the map display 20, the displayed detailed picture 2 is scrolled, and the detailed picture 1 is selected and displayed as the second map in cases in which the scrolling time continues for a predetermined value of two seconds, but the map is switched to the midrange picture 2 in cases in which the scrolling time continues for a predetermined value of four seconds.

At this time, the reduced scale control means 210 reads the map data of the midrange picture 1 from the data storage means 207. Otherwise, map data of the midrange picture 1 is distributed from the route search server 30 by transmission of the map data classification of the midrange picture 1 to the route search server 30 as necessary, and map data of the midrange picture 3 is created from this map data. The map is switched to the midrange picture 1 in cases in which the scrolling time continues for a predetermined value of six seconds. At this time, however, map data of the midrange picture 1 is read from the data storage means 207 and displayed. When the wide-area picture 1 is selected as the first map displayed by the map display 20, the second map is not displayed even if the displayed wide-area picture 1 is scrolled.

The condition judging means 209 judges, based on the specifics of the map data management table of FIG. 3 or 4 or the administered section information added to the map data, whether the conditions have been satisfied for changing the reduced scale of the second map in accordance with the selected first map data classification and the scrolling process performed by the scroll control means 208. According to the judgment results of the condition judging means 209, the reduced scale control means 210 preferably switches the second map display to the optimal city map, detailed picture, midrange picture, or wide-area picture, on the basis of the specifics of the map data management table of FIG. 3 or 4 or the administered section information added to the map data.

The predetermined values of the scrolling distance and scrolling time of the map data management table of FIG. 3 or 4 in the example described above are suitably set so that the optimal map can be displayed in view of the reduced scale of the scrolled map, the rate of the scrolling process, and other factors.

The route search server 30 is configured from control means 31, route search means 32, search network data DB 33, route guidance means 34, communication means 35, and map data DB 36.

The control means 31 is configured based on a microprocessor. The control means 31 comprises RAM, ROM, and other storage means similar to a common computer device, and controls the actions of the components through control programs stored in these storage means.

The route search means 32 refers to the search network data DB 33 and conducts a route search from the point of departure to the destination on the basis of the point of departure, the destination, other route search conditions, and current positional information transmitted from the map display 20. A method known as the label setting method or one known as the Dijkstra method is used as this type of route search method. This type of configuration is similar to that of a common navigation system.

As data for the route search, the search network data DB 33 includes road network data for a route search for an automobile, and pedestrian network data for a route search for a pedestrian. Furthermore, traffic network data based on transportation line data or service schedule data is included for route searching for the case of a pedestrian traveling both by foot and by train or another form of public transportation.

The road network data in the onboard navigation system is configured only by roads on which the automobile can travel, and there is no need for pedestrian road network data related to pedestrian-only roads, paths in parks or station squares where the entry of vehicles is prohibited, and the like. In a navigation system for pedestrians, the data is configured from the aforementioned pedestrian road network data for pedestrian-only roads, paths in parks or station squares where the entry of vehicles is prohibited, and the like in addition to a road network on which automobiles can travel, but there is no need for network data of high-speed roads and other roads where foot traffic is prohibited.

Therefore, the search network data DB33 comprises automobile road network data and pedestrian network data. In cases in which the route search request is a route search request for a pedestrian, the route search means 32 performs a route search by using pedestrian network data, and in cases in which the route search request is a route search request for an automobile, the route search means 32 performs a route search by using road network data.

The search network data DB33 may be configured so as to store road network data both for automobiles and for pedestrians, road network data for automobiles only, and road network data for pedestrians only. The network data compiling means (not shown) compiles the search network data DB33 and conducts a route search in accordance with the route search request.

In other words, the configuration can be designed so that in cases of a route search request for a pedestrian, the network data compiling means compiles data so as to add pedestrian-only network data to the common network data and conducts a route search. In cases in which the route search request is a route search request for an automobile, the network data compiling means preferably compiles data so as to add automobile-only network data to the common network data and conducts a route search. A traffic network is preferably added in cases in which travel by train or another form of public transportation is also used.

The route guidance means 34 is intended to compile data so as to embed data of the optimal route or a plurality of recommended guidance routes searched by the route search means 32 into map data that includes the current position read from the map data DB36, and to distribute the compiled results to the map display 20.

The communication means 35 is an interface for communicating with the map display 20 via the network 12, and is intended to receive route search conditions and various other requests from the map display 20. The communication means 35 is also intended to distribute to the map display 20 guidance route data, map data, guidance data, and other data that is the result of an optimal route search made by the route search means 32 and that is requested from the map display 20, as well as guidance route data needed for service and various other information.

The map data DB36 stores map data and a map data management table. The map data stored in the map data DB36 is composed of unit data (mesh data) sectioned by latitude and longitude into predetermined sizes. Administered section information is also set in the map data in advance as additional data. The route search server 30 distributes to the map display 20 optimal guidance route data obtained as a result of the route search, and, based on the current positional information (latitude and longitude) received from the map display 20, also distributes to the map display 20 map data that includes the current position, i.e., eight pieces of peripheral mesh data centered around mesh data that includes the current position. The map data management table is also distributed to the map display 20 as necessary.

The map data stored in the map data DB36 is in vector format and is configured from the respective different amounts of information at the four levels (layers) A through D, i.e., layers ranging from the wide-area map to the city map. For example, the map data DB36 stores only the four types of map data of the wide-area picture 1, the midrange picture 1, the detailed picture 1, and the city map 1. In the map data created in vector format, the sizes of the element vectors constituting the map can be easily enlarged or reduced by calculating the desired lengths using reduction ratios and enlargement ratios, and map data enlarged or reduced at different reduction ratios or enlargement ratios can be obtained based on the map data of a certain level.

The guidance route data is distributed with the addition of map data to the guidance route created as vector data. Set in the guidance route data are the point of departure, turning points in the route, intersection points, the destination, and other guide points along the guidance route searched by the route search means 32. Included in the guidance route data are the position coordinates (latitude and longitude) of these guide points, and guidance information pertaining to the guide points (guidance information for going straight or turning right or left). The map display 20 receives the distributed map data and guidance route data, displays the map and guidance route, and outputs the predetermined guidance by display or by audio when the guide points are reached.

Figure 5:
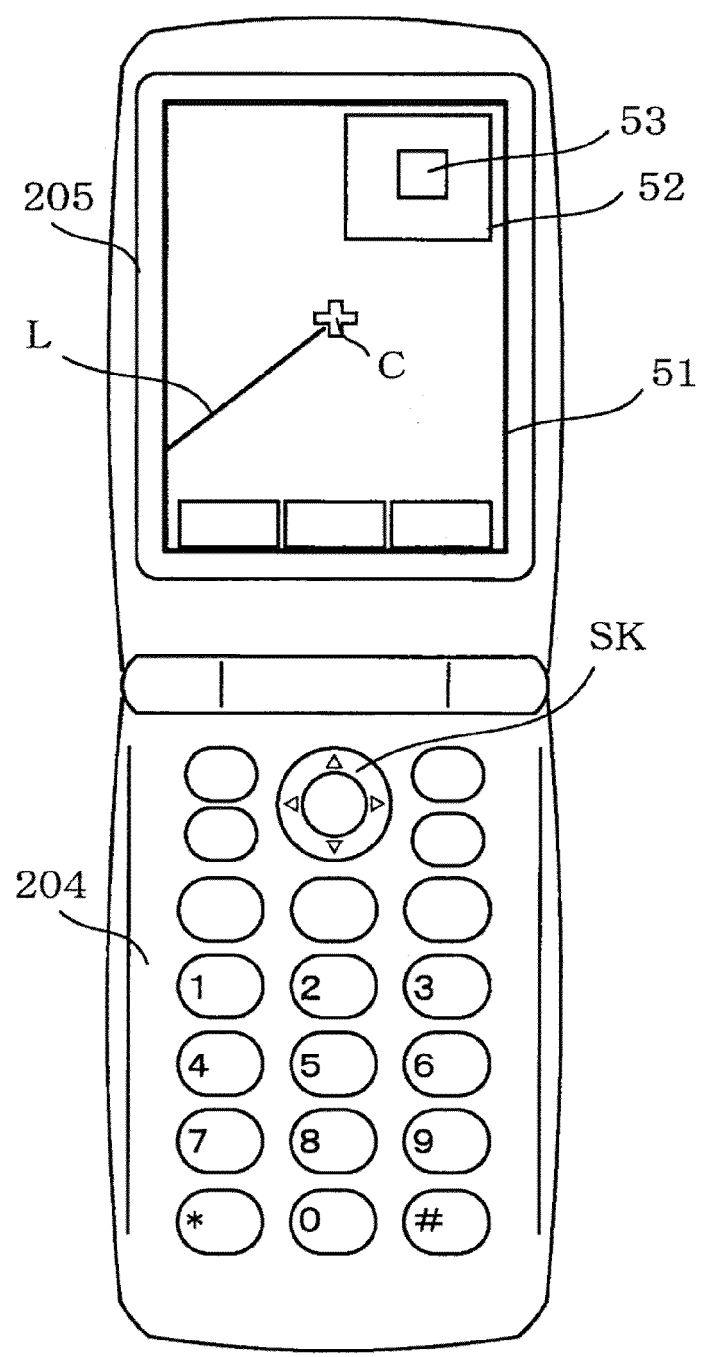
FIG. 5 is a view showing an external view of a portable phone as a map display according to an example of the present invention.

FIG. 5 is a view showing an external view of a portable phone as a map display according to an example of the present invention.

In the case that the map display 20 is a portable phone, the map display 20 comprises input means 204 and display means 205 as shown in FIG. 5. The keys of the input means 204 are provided with a scroll key SK (launcher key). A Clear key and a display form switch key are assigned to specified numeral keys or the like.

A first map display screen 51 and a second map display screen 52 are shown on the display means 205, and the cursor C is displayed on the display screen 51 so that the starting point of the scrolling operation and the current position of the cursor are joined by a straight line L and so that the state of cursor movement is visible. The display screen 52 displays a frame 53 showing the display scope of the first map displayed on the display screen 51.

When the scroll key SK is operated, the screen automatically switches to scroll mode and the cursor C is displayed on the display screen. In this case, scroll mode is continued until a state is achieved in which the scroll key SK has not been operated for a predetermined amount of time, or until the Clear key is operated. The initial display position of the cursor C is in the middle of the screen.

Figure 6:
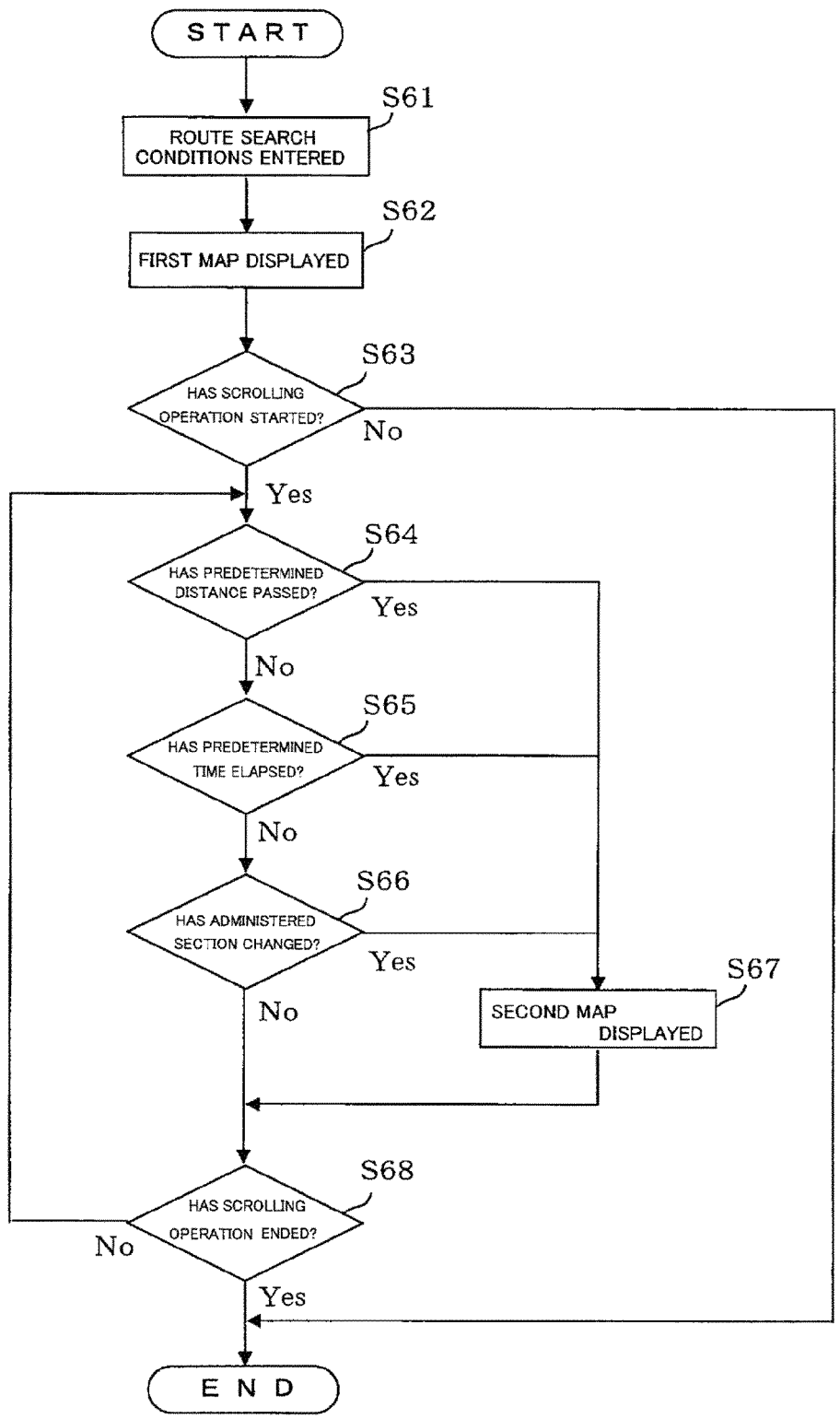
FIG. 6 is a flowchart showing the operational procedure of a map display according to an example of the present invention.

The following is a description, made with reference to the flowchart in FIG. 6, of the operational procedure of the map display method of the map display 20 according to an example of the present invention. FIG. 6 is a flowchart showing the operational procedure of the map display according to an example of the present invention.

The operational procedure shown in FIG. 6 is implemented by the control means 201 of the map display 20 executing the control program stored in ROM.

First, in the process in step S61, the input means 204 is operated; a service menu screen or a predetermined input screen is displayed on the display means 205; the point of departure, the destination, the travel means (walking, a combination of walking and public transportation, automobile, or the like), the planned departure time, the desired arrival time, and other route search conditions are entered; and a route search is requested of the route search server 30.

Figure 7:
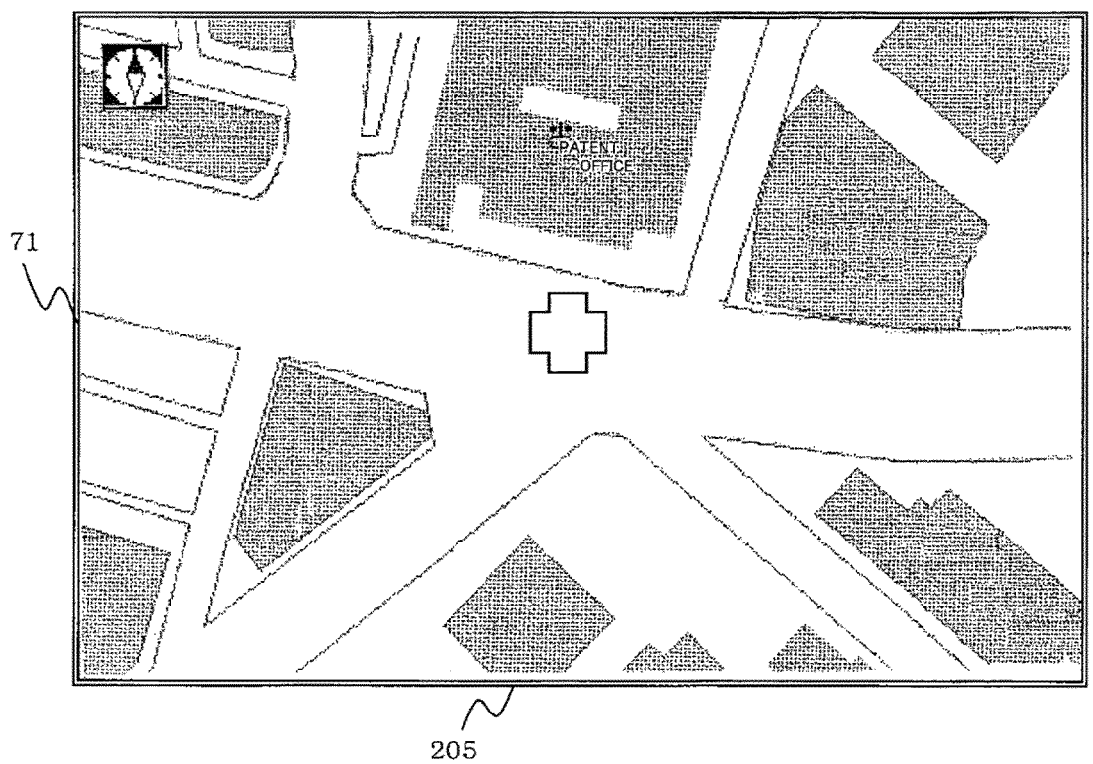
FIG. 7 is a view showing an example of a route search result screen according to an example of the present invention.

In the process of step S62, guidance route data and the like is received from the route search server 30 via the communication means 202, and the search result is displayed on the display means 205 in accordance with the guidance route data as shown in FIG. 7.

FIG. 7 is a view showing an example of a route search result screen displayed on the display means 205 during the route search result display process of step S62. The display means 205 is provided with a first map display screen 71 capable of displaying the data in a manner that allows for scroll movement. A map (first map) of the current location surroundings around the current position is displayed on the first map display screen 71.

Next, in the process of step S63, a judgment is made as to whether or not the scroll operation has been performed by the scroll control means 208. The process is ended in the case that the scroll operation has not been performed, and the process advances to step S64 in the case that the scroll operation has been performed.

In the process in step S64, a judgment is made by the condition judging means 209 as to whether or not the map scrolling distance has exceeded a predetermined value, e.g., three times or another multiple of the distance equivalent to the diagonal of the first display screen. The process advances to step S65 in the case that the scrolling distance has not exceeded the predetermined value, and the process advances to the second map display process of step S67 in the case that the scrolling distance has exceeded the predetermined value.

In the process in step S65, a judgment is made by the condition judging means 209 as to whether or not the map scrolling time has exceeded a predetermined value, e.g., two seconds or the like. The process advances to step S66 in the case that the scrolling time has not exceeded the predetermined value, and the process advances to the second map display process of step S67 in the case that the scrolling time has exceeded the predetermined value.

In the process of step S66, a judgment is made by the condition judging means 209 as to whether or not scrolling has caused a change in the administered section at a predetermined point in the first map display scope, e.g., in the center of the display screen (the position of the cursor C), the origin of the display coordinates, or the like. The process advances to step S68 in the case that the administered section has not changed, and the process advances to the second map display process of step S67 in the case that the administered section has changed. The phrase "a change in the administrative section" refers to a change in a street or town name or a prefecture name, or a change in a country name in a region where many countries are adjacent to each other, such as on a continent.

Next, in the process of step S68, a judgment is made by the scroll control means 208 as to whether or not the scroll operation has ended. The process returns to step S64 in cases in which the scroll operation has not ended, and the process is ended in cases in which a state is achieved wherein the scroll key SK has not been operated for a predetermined amount of time or the Clear key has been operated and the scroll operation has ended.

In the process of step S67, the reduced scale control means 210 reads from the data storage means 207 the map data of the second map corresponding to the first map scrolling distance and scrolling time, or the map data of the second map corresponding to the changed administered section. Otherwise, a request is made to the route search server 30 to acquire the corresponding map data as necessary. The map data of the second map read from the data storage means 207 is displayed together with the frame showing the first map display scope scrolled on the second display screen, the second display screen being provided so as to be superposed over the first display screen displaying the first map of the display means 205.

For example, in cases in which a map of inner Tokyo is displayed as the first map and a wide-area map of Tokyo is displayed as the second map, and also in which the current position displayed as the first map moves outside of Tokyo as a result of the scrolling of the map of inner Tokyo displayed as the first map, the second map is switched from a wide-area map of Tokyo to an entire map of the wide area known as Kanto.

Figure 8:
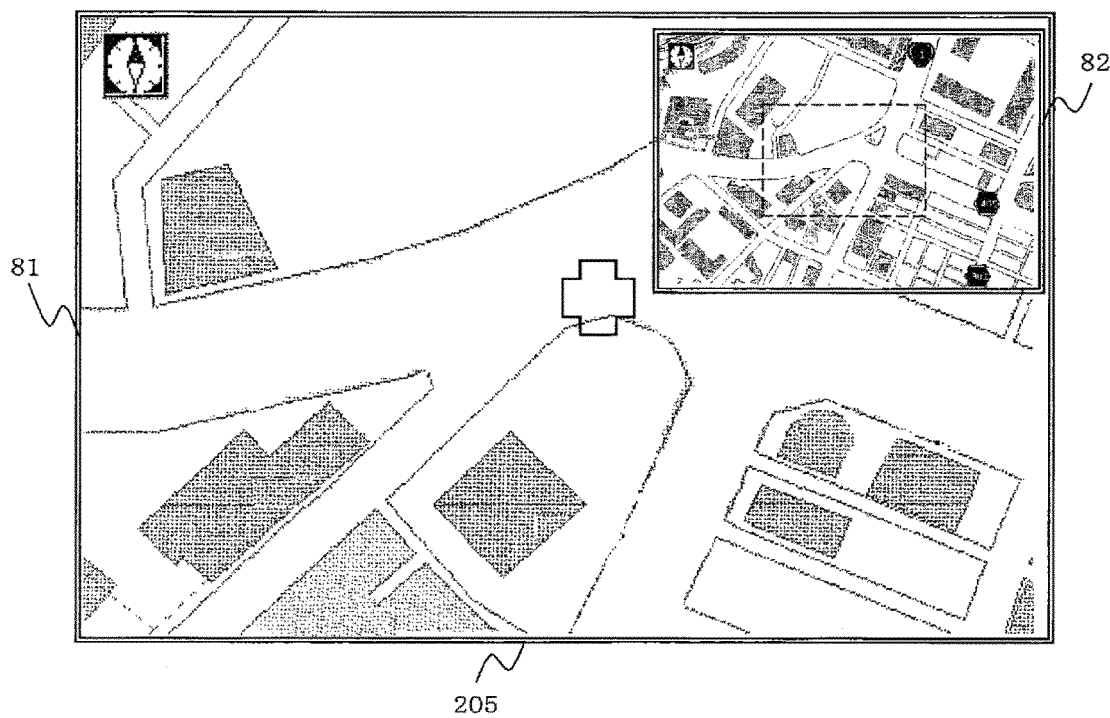
FIG. 8 is a view showing an example of a scroll result screen according to an example of the present invention.

FIG. 8 is a view showing an example of a scroll result screen displayed on the display means 205 during the scrolling process of step 67. The display means 205 is provided with a first map display screen 81 and a second map display screen 82, whereby map data can be displayed in a manner that allows for scrolling movement. The first map display screen 81 displays the map being scrolled, and the second map display screen 82 displays a wide-area map that includes the display scope of the map being scrolled.

Figure 9:
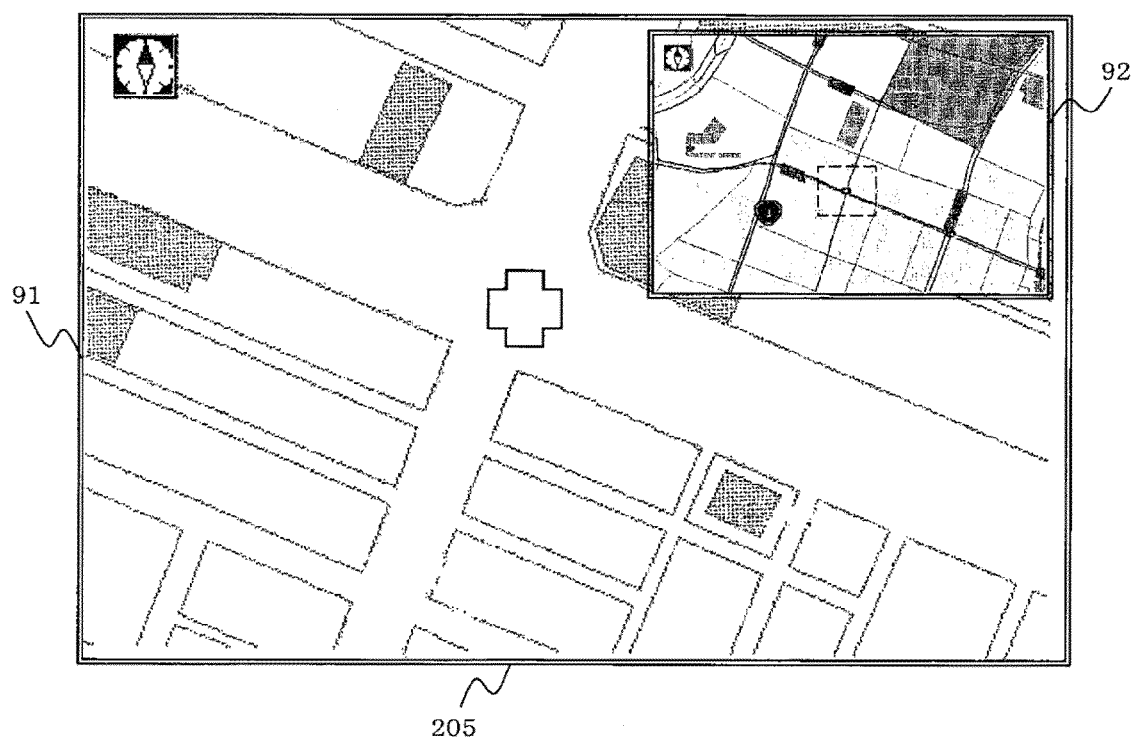
FIG. 9 is a view showing another example of a scroll result screen according to an example of the present invention.

FIG. 9 is a view showing another example of a scroll result screen displayed on the display means 205 during the scrolling process of step 67. FIG. 9 shows a scroll result screen of a case in which the scrolling process is continued further from the scroll result screen in FIG. 8. The display means 205 is provided with a first map display screen 91 and a second map display screen 92 whereby the map data can be displayed in a manner that allows for scrolling movement. The first map display screen 91 displays a scrolled map that has continued scrolling further, and the second map display screen 92 displays a wider-area map that includes the display scope of the scrolled map.

In the example described above, the determination of whether or not the process will advance to the second map display process of step S67 is made based on the judgment process of whether the scrolling distance exceeds the predetermined value in step S64, on the judgment process of whether the scrolling time exceeds the predetermined value in step S65, and on the judgment process of whether the administered section has been changed by scrolling in step S66, but this determination is not limited to this option alone and may be made based on only one of any of these judgment processes.

The example described above is configured so that only the necessary map data is preserved in the data storage means 207 of the map display 20, and the map data is distributed from the route search server 30 to the map display 20 at the point in time when map data of a different level or ratio is required. However, another possible configuration is one wherein map data at four levels (A through D) of different information amounts, such as the wide-area picture 1, the midrange picture 1, the detailed picture 1, and the city map 1, are all preserved in advance in the data storage means 207; and the process of creating enlarged or reduced map data can be performed quickly by performing a reduction or enlargement calculation at a predetermined ratio from map data read from the data storage means 207 during the scrolling process.

Another possible configuration is one wherein map data of four different types of levels (A through D) is preserved in the route search server 30, enlarged or reduced map data is created as necessary from this map data by performing a reduction or enlargement calculation at a predetermined ratio, and the resulting map data is distributed. The load imposed by the process of calculating the reduction or enlargement of the map data in the map display 20 can thereby be reduced, the communication of map data between the route search server 30 and the map display 20 is preferably conducted only when a map of a different level is needed, and the load of communicating the map data can be reduced.

In the example described above, the map data stored in the map data DB36 is created in vector format, but the format is not limited to this option alone, and map data created in a bitmap format may also be used. In cases in which the map is reduced or enlarged, the map data created in a bitmap format requires that bitmap data reduced or enlarged at the necessary reduction ratio or enlargement ratio be created in advance.

As described in detail above, the navigation system according to the present invention is characterized in that the display form of the second map that includes the scope of the first map is changed in optimal manner in conjunction with the scrolling process of the scrollable first map. Therefore, the display form of the second map can be controlled according to the scrolling process, and the optimally changed second map can be displayed even if the scope of the first map continues to be moved by scrolling. The position of the first map and of its scope can thereby be easily visually confirmed on the second map changed to the optimal display form.

In cases in which a detailed map designed to be scrolled according to the prior art is subjected to continued scrolling, the location of the currently displayed detailed map being scrolled has been known to deviate from the wide-area map. Changing the reduced scale of the wide-area map according to the scrolling process as in the present invention allows the detailed map being scrolled to be securely included within the wide-area map whose reduced scale has changed. Therefore, it is easy to visibly confirm the position and scope of the detailed map being scrolled within the wide-area map, and the usefulness of the navigation system according to the present invention proves effective.

The navigation system according to the above example of the present invention was described as a communicable navigation system composed of a map display and a route search server, but the present invention is not limited to a communicable navigation system. As long as updating of the map data can be managed, a configuration can also be used in which data is downloaded to a portable information device that acts as a standalone device in which the map display and the route search server are integrated, and route guidance is performed by the portable information terminal alone.

The navigation system according to the present invention is not limited to the configurations described above, and the map display may also be a portable phone, a PDA, or another portable electronic device. The route search server may be a server also having an automobile navigation function in addition to a navigation function for pedestrians. A map display system having no navigation function may also be used. The device may also be a portable phone that does not have navigation service, or a portable phone that does not have GPS positioning means. In the case of a portable phone having no GPS positioning means, it is preferable that positional information of the communication area be acquired by registering the position with a base station, and that the route search server determine the position by receiving the positional information from the portable phone.

Since the present invention is a technique relating to a map display method, the present invention is not limited to the present embodiment, and the present invention may be implemented as a map display application for a portable phone and may also be applied to a map website for providing map display service to a personal computer or another terminal device connected via the Internet.

The invention claimed is:

1. A map display system comprising a map display for displaying a plurality of maps, and an information distribution server for distributing map data to said map display, the information distribution server being connected to said map display via communication means; said map display system characterized in comprising:
   display means for displaying a scrollable first map and a second map containing the scope of said first map;
   scroll control means for scrolling said first map;
   condition judging means for judging whether or not a result obtained by scrolling said first map by said scroll control means has satisfied a preset condition; and
   display control means for controlling the display form of said second map, wherein
   said display control means is configured so as to control the display form of said second map on the basis of the judgment result of said condition judging means.

2. The map display system according to claim 1, characterized in that said condition judging means judges whether or not a distance over which said first map is scrolled by said scroll control means has reached a predetermined distance; and
   said display control means is configured so as to control a reduced scale of said second map on the basis of the judgment result of said condition judging means.

3. The map display system according to claim 1, characterized in that said condition judging means judges whether or not a time during which said first map is scrolled by said scroll control means has exceeded a predetermined time; and
   said display control means is configured so as to control a reduced scale of said second map on the basis of the judgment result of said condition judging means.

4. The map display system according to claim 1, characterized in that said condition judging means judges whether or not an administered section has been changed by the scrolling of said first map via said scroll control means; and
   said display control means is configured so as to control a reduced scale of said second map on the basis of the judgment result of said condition judging means.

5. The map display system according to any of claims 1 through 4, characterized in that said map display system further comprises positioning means for measuring a current position of the map display, and route search means for searching for a route from a point of departure to a destination on the basis of route search conditions; and
   said display means is configured so as to display the first map using map data of the guidance route searched by the route search means and to display on the first map a current position mark indicating the current position measured by said positioning means.

6. A map display for displaying a plurality of maps, said map display characterized in comprising:
   display means for displaying a scrollable first map and a second map containing the scope of said first map;
   scroll control means for scrolling said first map;
   condition judging means for judging whether or not a result obtained by scrolling said first map by said scroll control means has satisfied a preset condition; and
   display control means for controlling the display form of said second map; wherein
   said display control means is configured so as to control the display form of said second map on the basis of the judgment result of said condition judging means.

7. The map display according to claim 6, characterized in that said condition judging means judges whether or not the distance over which said first map is scrolled by said scroll control means has reached a predetermined distance; and said display control means is configured so as to control a reduced scale of said second map on the basis of the judgment result of said condition judging means.

8. The map display according to claim 6, characterized in that said condition judging means judges whether or not a time during which said first map is scrolled by said scroll control means has exceeded a predetermined time; and said display control means is configured so as to control a reduced scale of said second map on the basis of the judgment result of said condition judging means.

9. The map display according to claim 6, characterized in that said condition judging means judges whether or not an administered section has been changed by the scrolling of said first map via said scroll control means; and said display control means is configured so as to control a reduced scale of said second map on the basis of the judgment result of said condition judging means.

10. The map display according to any of claims 6 through 9, characterized in that said map display further comprises positioning means for measuring the current position of the map display; and said display means displays the first map using map data of a guidance route searched based on route search conditions, and displays on the first map a current position mark indicating the current position measured by said positioning means.

11. A map display method in a map display comprising display means for displaying a plurality of maps, said map display method characterized in having:

a first step for displaying a scrollable first map on said display means;

a second step for displaying a second map containing the scope of said first map on said display means;

a third step for scrolling said first map;

a fourth step for judging whether or not a result obtained by scrolling said first map in accordance with said third step has satisfied a preset condition; and a fifth step for controlling the display form of said second map on the basis of the judgment result via said fourth step.

12. The map display method according to claim 11, characterized in that said fourth step judges whether or not the distance over which a first map is scrolled in accordance with the third step has reached a predetermined distance; and said fifth step is configured so as to control a reduced scale of said second map on the basis of the judgment result via said fourth step.

13. The map display method according to claim 11, characterized in that said fourth step judges whether or not a time during which said first map is scrolled in accordance with said third step has exceeded a predetermined time; and said fifth step is configured so as to control a reduced scale of said second map on the basis of the judgment result via said fourth step.

14. The map display method according to claim 11, characterized in that said fourth step judges whether or not an administered section has been changed by the scrolling of said first map via said third step; and said fifth step is configured so as to control a reduced scale of said second map on the basis of the judgment result via said fourth step.

15. The map display method according to any of claims 11 through 14, characterized in that said first step displays the first map using map data of a guidance route searched based on route search conditions, and a current position mark indicating a current position of the map display.

* * * * *